(12) United States Patent
Lee et al.

(10) Patent No.: US 7,040,113 B2
(45) Date of Patent: May 9, 2006

(54) KIMCHI STORAGE FACILITY

(75) Inventors: Young Gil Lee, Asan (KR); Kyung Ho Park, Hanam (KR)

(73) Assignee: Winia Mando, Inc., Asan (KR)

( * ) Notice: Subject to any disclaimer, the term of this patent is extended or adjusted under 35 U.S.C. 154(b) by 185 days.

(21) Appl. No.: 10/832,395

(22) Filed: Apr. 27, 2004

(65) Prior Publication Data

US 2004/0250565 A1    Dec. 16, 2004

(30) Foreign Application Priority Data

Apr. 30, 2003  (KR) ..................... 10-2003-0227614
Jul. 29, 2003  (KR) ..................... 10-2003-0052197

(51) Int. Cl.
  *F25D 17/04*  (2006.01)
  *F25D 17/06*  (2006.01)
(52) U.S. Cl. ............................. 62/407; 62/419; 62/440
(58) Field of Classification Search .................. 62/157, 62/187, 229, 407, 419
  See application file for complete search history.

(56) References Cited

U.S. PATENT DOCUMENTS 5,542,262 A * 8/1996 Park ............................ 62/229
5,947,197 A * 9/1999 Lee et al. .................... 165/206
6,006,533 A * 12/1999 Seol ........................... 62/228.1

* cited by examiner

*Primary Examiner*—Melvin Jones
(74) *Attorney, Agent, or Firm*—Fitzpatrick, Cella, Harper & Scinto

(57) ABSTRACT

A Kimchi storage facility having a non-contact power supply device is provided. The Kimchi storage facility includes a main body provided with a storage room storing Kimchi, and a mechanic room where a power supply is installed, a door opening and closing the storage room, and a non-contact power supply device which is installed between the door and the main body, to supply power by an electromagnetic induction. A magnetic levitation unit is provided in a fan accommodation case and rotated in a magnetic levitation rotating manner by induced current supplied via the non-contact power supply device, to thus forcedly circulate cooled air in the storage room. Here, a rotating fan is installed in the lower portion of the door at the state where the rotating fan is accommodated in the fan accommodation case, or a driving motor and a fan which are connected with the non-contact power supply device by wire are installed in the lower portion of the door.

Thus, the rotating fan is rotated in a magnetic levitation rotation manner, or the driving motor is driven to make the fan rotate, by the induced current supplied via the non-contact power supply device. Accordingly, the cooled air in the storage room can be forcedly circulated to thus improve deviation of temperature in the storage facility.

11 Claims, 14 Drawing Sheets

KIMCHI STORAGE FACILITY

BACKGROUND OF THE INVENTION

1. Field of the Invention

The present invention relates to a storage facility keeping in store foods such as Kimchi which is the Korean preserved vegetables, and more particularly, to a Kimchi storage facility having a non-contact power supply device which supplies induced current by which a rotating fan is rotated to thereby improve deviation of temperature in a storage chamber, in which the rotating fan which rotates in a magnetic levitation rotation manner or a fan which is driven and rotated by a driving motor, is installed on the bottom of a door to forcedly circulate internal air in the storage chamber, and the non-contact power supply device is installed between a main body and the door, and receives power from a power supply in the main body to then transfer power between the door and the main body by an electromagnetic induction.

2. Description of the Related Art

As is well known, a Kimchi storage facility is one of electric home appliances which can maintain the taste and freshness of the Kimchi for a long time, including a ripening unit which ripens Kimchi by using a ripening heater, and a cooling cycle unit which maintains the ripened Kimchi at a low temperature by using the principle of a refrigerator. Recently, the Kimchi storage facilities stand in the spotlight of housewives.

FIG. 1 is a perspective view showing an external structure of a conventional storage facility in which preserved vegetables such as one Korean traditional food called "Kimchi" are kept in store. FIG. 2 is a cross-sectional view showing an internal structure of the Kimchi storage facility shown in FIG. 1.

As shown in FIGS. 1 and 2, a Kimchi storage facility includes at least one storage chamber 300 in a main body 100 having an external appearance of a predetermined shape, and at least one door 200 which is located in the upper portion of the main body 100 and coupled by at least one hinge 210 in the upper-rear end of the main body 100, in order to open and close the at least one storage chamber 300.

Also, a display manipulator 400 having a number of buttons which can control Kimchi stored in the storage chamber 300 to be kept in store or ripened is installed in the upper-front portion of the main body 100.

Also, as shown in FIG. 2, a mechanic room 600 partitioned from the storage chamber 300 is formed in the lower portion inside the main body 100.

Here, in the mechanic room 600 are mounted a compressor 610 which is driven by an applied electric power and compresses a low-temperature low-pressure coolant into a high-temperature high-pressure coolant, and a cooling cycle unit including a condenser 620 for condensing the coolant having passed through the compressor 610.

Also, a control unit 640 is mounted in a control box in the mechanic room 600. The control unit 640 is connected to the display manipulator 400, and includes a printed circuit board (PCB) on which various chips and circuits are formed, in order to control the overall operations of the Kimchi storage facility such as the temperature in the storage chamber 300 and operations of a variety of the devices in the Kimichi storage facility.

Also, on the outer wall in the storage chamber 300 are provided an evaporator 630 which evaporates the coolant decompressed when the coolant has passed through the condenser 620 and a capillary tube into a low-temperature coolant at a low-pressure state, and absorbs heat from the air in the storage chamber 300, and cools the air in the storage chamber 300, a ripening heater 650 which heats the storage chamber 300 according to manipulation of the buttons on the display manipulator 400, under the control of the control unit 640, and a temperature sensor 660 which detects temperature of the storage chamber 300, under the control of the control unit 640.

The operation of the Kimchi storage facility having the above-described structure will be described below, in connection with a ripening process and a storing process for Kimchi.

First, a storing container which stores foods such as Kimchi which is the Korean preserved vegetables requiring a ripening process, is accommodated in the storage chamber 300 in a Kimchi storage facility, and then a basic control command relying upon the kind of Kimchi is selected by pressing buttons of the display manipulator 400, in order to drive the Kimchi storage facility.

Here, in the case that the stored Kimchi requires for a ripening process, the ripening heater 650 is made to operate according to a running course selected by the control unit 640, so that the Kimchi undergoes the ripening process.

When the Kimchi accommodated in the storage chamber 300 has been ripened into a user's desired state, the cooling cycle is made to operate to supply the storage chamber 300 with cold air.

That is, when the cooling cycle operates as described above, cold air is supplied from the evaporator 630 to the storage chamber 300. As a result, the temperature in the storage chamber 300 is lowered into a low temperature appropriate for a Kimchi storing temperature. In this manner, the Kimchi storing temperature in the storage chamber 300 is controlled by a predetermined set program to be maintained constant.

Thus, the Kimchi stored in the storage chamber 300 can be stored for a long time at a user's desired fresh state.

However, during a process of supplying the conventional storage chamber 300 with cold air and thus maintaining a temperature in the storage chamber 300 into a temperature appropriate for keeping the Kimchi in store, a deviation of temperature of 0.5~1.0° C. may occur between the upper and lower portions in the storage chamber 300.

In this case, since the internal temperature in the storage chamber 300 is not maintained uniformly due to a temperature deviation, the stored Kimchi is not kept in store at a uniformly cool state in the upper and lower portions of the storage chamber 300, and thus ripened states of the Kimchi stored in the upper and lower portions of the storage chamber 300 may differ from each other.

As a result, since the temperature deviation in the storage chamber 300 may make a bad influence on the Kimchi stored for a long time in the storage chamber 300 when considering the features of Kimchi which is sensitive to a change in temperature during a process of ripening and storing Kimchi, it is one of very important technical factors to minimize the internal temperature deviation in the storage chamber 300 into 0.5° C. or lower in order to guarantee enhancement of performance of Kimchi storage facility and reliability of a product from consumers.

Here, reasons why the temperature deviation occurs in the upper and lower portions in the storage chamber 300, will be described below.

Coolant pipe which is the evaporator 630 which winds around the storage chamber 300 is usually wound from the lower portion to the upper portion in the storage chamber 300 when considering a flowing feature of coolant. Accordingly, coolant flows from the lower portion to the upper portion in the storage chamber 300, to thus perform heat exchange (that is, evaporation of coolant). As a result, the lower portion in the storage chamber 300 is subject to receive more cold air than the upper portion therein.

Thus, the temperature in the lower portion in the storage chamber 300 becomes low, and the temperature in the upper portion therein becomes high. Therefore, a temperature deviation occurs between the upper and lower portions in the storage chamber 300.

Further, a door 200 is provided in the upper portion of the storage chamber 300. Accordingly, although the door 200 is closed and thus the storage chamber 300 is in a sealed state, heat transfer such as heat conduction occurs through the upper sealed surface in the storage chamber 300. Also, external warm air may penetrate into the storage chamber 300 through the sealed surface in the storage chamber 300. As a result, since the storage chamber 300 may be easily influenced by the relatively higher external temperature, the temperature in the upper portion of the storage chamber 300 becomes higher than that in the lower portion thereof. That is, a temperature deviation occurs in the storage chamber 300.

In particular, when the door 200 is opened and closed, the cold air in the upper portion in the storage chamber 300 is discharged, and the external warm air flows in. Accordingly, the upper portion in the storage chamber 300 maintains a higher temperature than the lower portion therein.

In order to solve the above-described temperature deviation, it is desirable that the cold air in the storage chamber 300 is circulated convectively to uniformly cool the inner portion of the storage chamber 300. However, the conventional Kimchi storage facility cannot solve the temperature deviation naturally, since a natural convention phenomenon, where cold air falls down and warm air rises up, does not occur at a state where the storage chamber 300 maintains a sealed space.

That is, cold air cannot be convected naturally from the lower portion having a substantially low temperature in the storage chamber 300 toward the upper portion having a relatively higher temperature in the storage chamber 300.

Thus, the cold air in the upper and lower portions in the storage chamber 300 is forcedly convected to be mixed with each other, to thereby need to minimize the temperature deviation.

According to the above-described necessity, there have been proposed various methods which can forcedly convect cold air in the conventional storage chamber 300 in order to solve the temperature deviation problem in the storage chamber 300. One of them was filed as Korean Utility Model application by the same applicant as that of this application, in which a fan and a driving motor which are forced convection units are mounted on a door and cold air is forcedly circulated by the fan in a storage chamber.

That is, the Korean Utility Model Publication No. 2001-243228 on Oct. 15, 2001 entitled "Kimchi storage facility provided with forced convection unit" was disclosed by the same applicant.

Here, the Kimchi storage facility which was previously disclosed in the Korean Utility Model Publication will be described below.

FIG. 3 is a cross-sectional view showing a state where a driving motor and a fan are mounted on a door of a conventional Kimchi storage facility. As shown in FIG. 3, the Kimchi storage facility includes a driving motor 510 which is installed in the middle of the inner portion of a door 200 and is driven by power applied from a power supply in a control unit 640 in a main body 100, and a fan 500 which receives a rotational force of the driving motor 510 to rotate and forcedly circulate air in a storage chamber 300.

Through the above-described configuration, the air in the storage chamber 300 is forcedly circulated by driving of the fan 500. In this process, warm air in the upper portion falls down and cold air in the lower portion rises up, so that the warm air and the cold air is mixed with each other, which is called a forced convection. Accordingly, the internal temperature in the storage chamber 300 maintains a uniform state in the upper and lower portions. As a result, Kimchi stored in the storage chamber 300 is uniformly cooled and kept in store more effectively.

However, in the case of the above-described Kimchi storage facility, a power supply line 520 (hereinbelow shortly a cable 520) should be connected from the main body 100 to the door 200 for supplying electric power in order to drive the fan 500 and the driving motor 510 which are installed on the rear surface of the door 200. When the conventional main body 100 and door 200 are fabricated separately and assembled in an assembly line, it is difficult to design a cable 520 connecting between the main body 100 and the door 200 in view of the conventional Kimchi storage facility structure, so that the cable 520 is not exposed. In the case that the cable 520 is exposed between the main body 100 and the door 200, it is difficult to finish the Kimchi storage facility neatly, to thus run a risk of reducing a consumer's purchasing desire.

In order to supplement the above-described problems, the Kimchi storage facility may be designed so that a cable 520 is not exposed. However, since a cable 520 should be connected between the main body 100 and the door 200 which are separately fabricated, the whole assembly process becomes hard.

SUMMARY OF THE INVENTION

To solve the above problems of the conventional Kimchi storage facility having a fan and a driving motor, it is an object of the present invention to provide a storage facility keeping in store foods such as Kimchi which is the Korean preserved vegetables, having a non-contact power supply device which is installed on the bottom of a door to forcedly circulate internal air in a storage chamber, and a non-contact power supply device which receives power from a power supply in the main body in order to supply power to the fan which forcedly circulate the internal air in the storage chamber and to then transfer power between the door and the main body by an electromagnetic induction.

That is, since the present invention provides the Kimchi storage facility having the non-contact power supply device, power can be supplied without connecting a separate cable between the main body and the door. As a result, an assembly work is facilitated in an assembly production line. Also, since a power supply line is not exposed externally, a separate finishing treatment is not necessary.

It is another object of the present invention to provide a Kimchi storage facility having a non-contact power supply device and a rotating fan operating in a magnetic levitation rotation manner to thereby improve an internal deviation of temperatures, in which the rotating fan which rotates in a magnetic levitation rotation manner without a driving motor through induced current supplied via the non-contact power supply device, in order to solve the problems that a general driving motor may corrode due to moisture in the storage chamber and condensed water formed on the surface of the door and may malfunction very frequently when driving the fan.

According to another object of the present invention as described above, the rotating fan is made to rotate in a magnetic levitation rotation manner, and thus a general driving motor for driving a fan is not necessary. Accordingly, there is no worry about corrosion of the driving motor due to moisture. Also, no frictional noise occurs since the rotating fan rotates without contacting the driving motor.

In particular, the present invention provides a Kimchi storage facility in which a fan accommodation case for accommodating the rotating fan is connected on the bottom of the door via a connector and then turned and fitted into a guide fitting unit provided on the bottom of the door. Accordingly, since the rotating fan rotates in a magnetic levitation rotation manner, it is easy to mount the fan accommodation case without any assistance of a separate tool as well as the rotating fan.

To accomplish the above object of the present invention, according to a first aspect of the present invention, there is provided a storage facility keeping in store foods such as Kimchi which is the Korean preserved vegetables, which comprises a main body provided with a storage room storing Kimchi, and a mechanic room where a power supply is installed, and a door opening and closing the storage room, the storage facility comprising: a non-contact power supply device having a first coil unit which receives power from the power supply and transfers power by electromagnetic induction, which is mounted in the upper portion of the main body, and a second coil unit which is mounted in the door in correspondence to the first coil unit; a driving motor which receives induced current via the non-contact power supply device and is driven; and a fan which rotates by the driving force of the driving motor and forcedly circulates cold air in the storage chamber, which is installed in the inner portion of the door.

Here, it is preferable that the first coil unit in the non-contact power supply device comprises a first printed circuit board (PCB) substrate which is accommodated in a space enclosed by a lower protection cover at one side of the upper portion of the main body, and a bobbin which is connected to the first PCB substrate and around which coil is wound, so as to be connected to the power supply via a cable to receive power. Also, it is preferable that the second coil unit in the non-contact power supply device comprises a second printed circuit board (PCB) substrate which is accommodated in a space enclosed by an upper protection cover installed in the door so that induced current can be generated by electromagnetic induction against the first coil unit, and a bobbin which is connected to the second PCB substrate and around which coil is wound.

Meanwhile, according to a second aspect of the present invention, there is provided a Kimchi storage facility comprising a rotating fan which is installed on the bottom of a door at a state where the rotating fan is mounted in a fan accommodation case provided with a magnetic levitation unit instead of a driving motor and a fan which are employed in the first aspect of the present invention, and which rotates in a magnetic levitation rotation manner by induced current supplied from a non-contact power supply device, to thereby forcedly circulate cold air in a storage chamber.

Here, the magnetic levitation unit according to the second aspect of the present invention comprises: a plurality of electromagnets which are connected to the second coil unit in the non-contact power supply device by wire and installed in the fan accommodation case at a predetermined interval to generate an electromagnetic force at a state where polarities of N-pole and S-pole are separated individually; a third permanent magnet which is distant from the electromagnets to have a space where the rotating fan can be installed, and which is installed on the central inner wall of the bottom of the fan accommodation case; a first permanent magnet which generates a repulsive force against the plurality of electromagnets in which N-poles and S-poles which are integrally mounted in one side of the rotating fan are repeatedly magnetized so that the rotating fan can receive a rotational force; and a second permanent magnet which generates a repulsive force against the third permanent magnet and which is integrally mounted on the other side surface of the rotating fan which opposes the first permanent magnet.

Thus, the rotating fan which is freely rotatably installed in the fan accommodation case can rotate in a magnetic levitation rotation manner by the mutual repulsive force between the plurality of electromagnets and the first permanent magnet, and between the second permanent magnet and the third permanent magnet.

Also, the fan accommodation case comprises: a cap-shaped fan cover in which the rotating fan is accommodated and supported, on the bottom of which a plurality of inhaling holes are formed so that cold air in the storage chamber can be inhaled and discharged, on the lateral surfaces of which a plurality of discharging holes are formed, and on the bottom of which the third permanent magnet is mounted on the central inner wall thereof; a base cover which includes a cover surface which blocks the upper opening of the fan cover and a support hole through which the rotational axis of the rotating fan is inserted freely rotatably at the center of the cover surface, in which an electromagnets accommodation unit accommodating the electromagnets of the magnetic levitation unit is provided on the cover surface facing the support hole and which is fitted with the fan cover and mounted in a mount portion provided on the bottom of the door.

Here, it is preferable that a flange-shaped fitting guide is provided on the outer circumferential surface of the electromagnets accommodation portion in the base cover. Also, it is preferable that the fan accommodation case can be easily detachably installed on the bottom of the door, by configuration of the base cover in which the base cover is turned and fitted with the guide fitting portion provided in the mount portion on the bottom of the door via the fitting guide.

Of course, it is preferable that the fan cover and the base cover are fitted with each other in a hook manner.

Also, according to the second aspect of the present invention, the rotating fan comprises: a cylindrical body on both sides of which the first permanent magnet and the second permanent magnet are mounted, a wing portion having a plurality of rotating wings which are formed on the outer circumferential surface of the cylindrical body; and a rotating axis which protrudes at the center of the cylindrical body, so as to be freely rotated by magnetic levitation in the fan accommodation case.

BRIEF DESCRIPTION OF THE DRAWINGS

The above and other objects and advantages of the present invention will become more apparent by describing the preferred embodiments thereof in more detail with reference to the accompanying drawings in which.

DETAILED DESCRIPTION OF THE INVENTION

Figure 1:
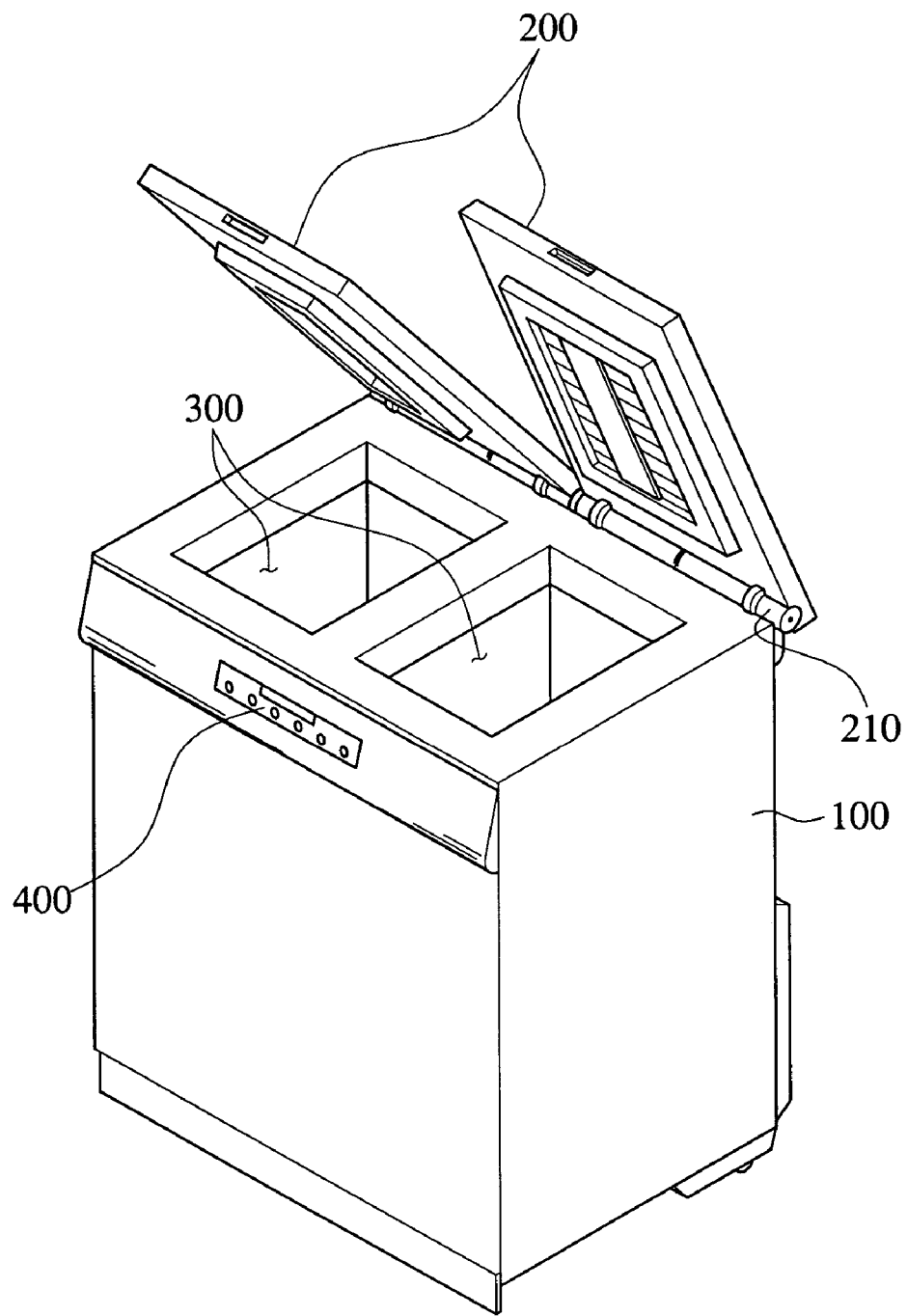
FIG. 1 is a perspective view showing an external structure of a conventional storage facility in which preserved vegetables such as Korean traditional food called "Kimchi" are kept in store.
Figure 2:
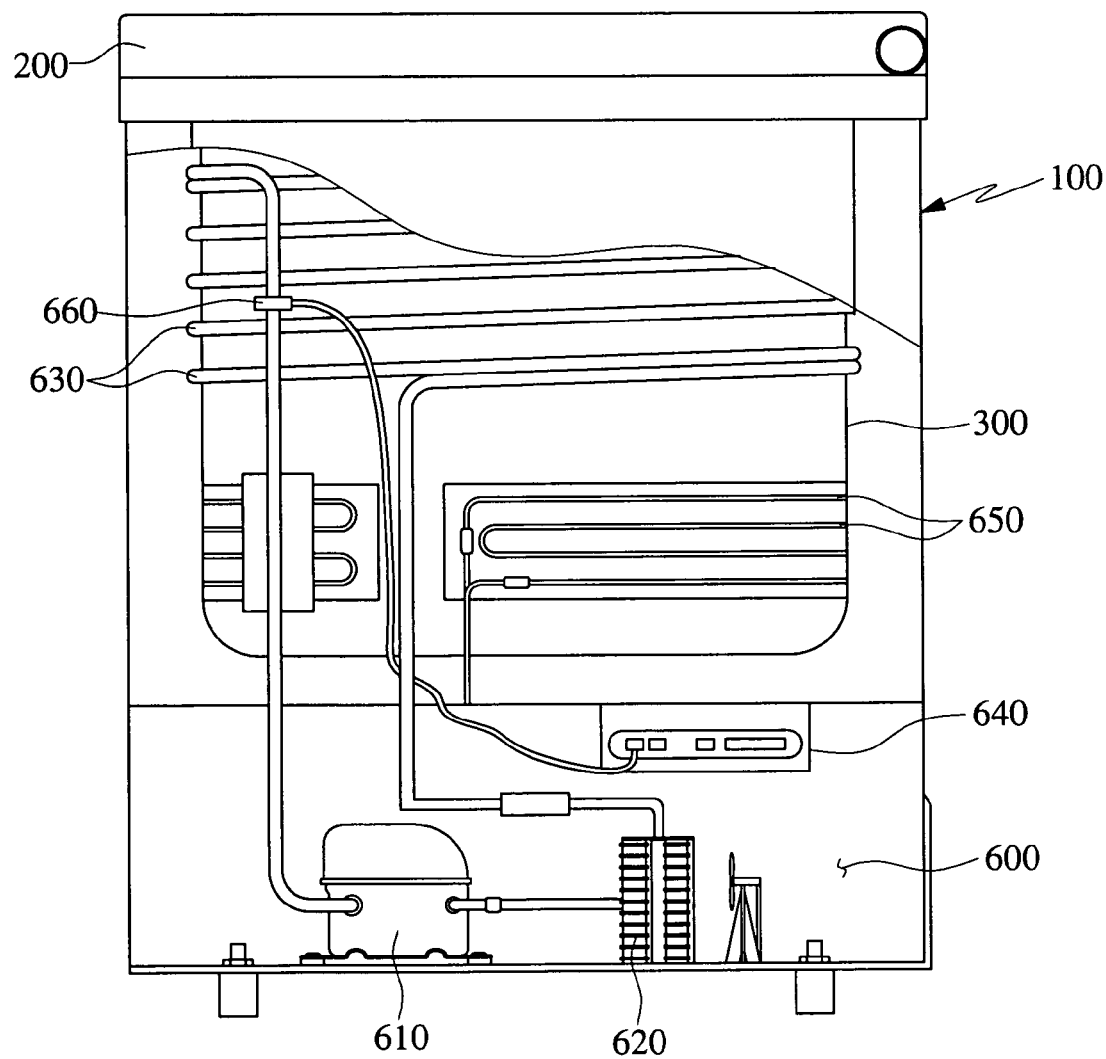
FIG. 2 is a cross-sectional view showing an internal structure of the Kimchi storage facility shown in FIG. 1.
Figure 3:
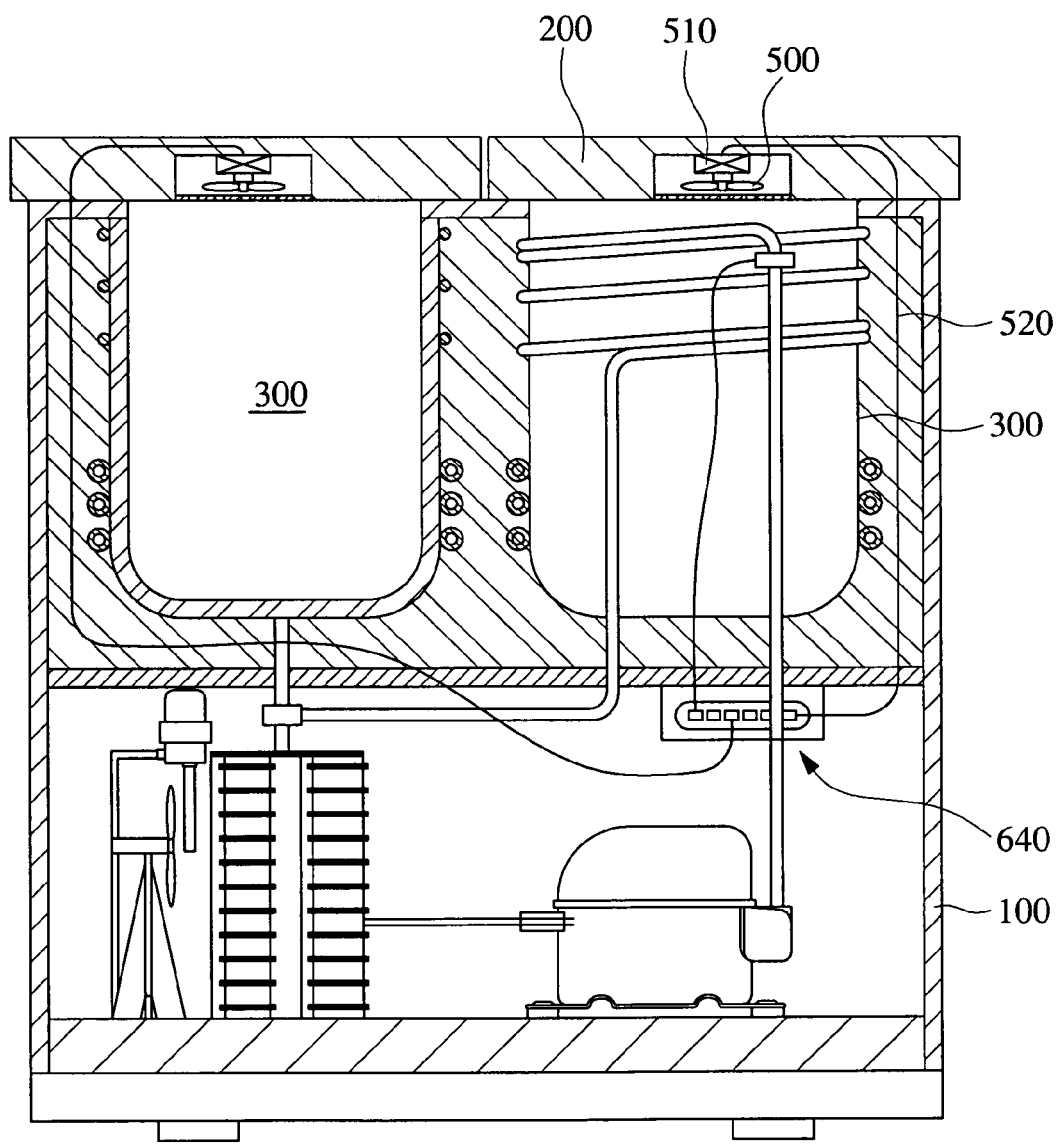
FIG. 3 is a cross-sectional view showing a state where a driving motor and a fan are mounted on a door of a conventional Kimchi storage facility.

Preferred embodiments of the present invention will be described with reference to the accompanying drawings.

When first and second embodiments of the present invention will be described, the same names and reference numerals will be assigned with respect to the same elements and portions.

Figure 4:
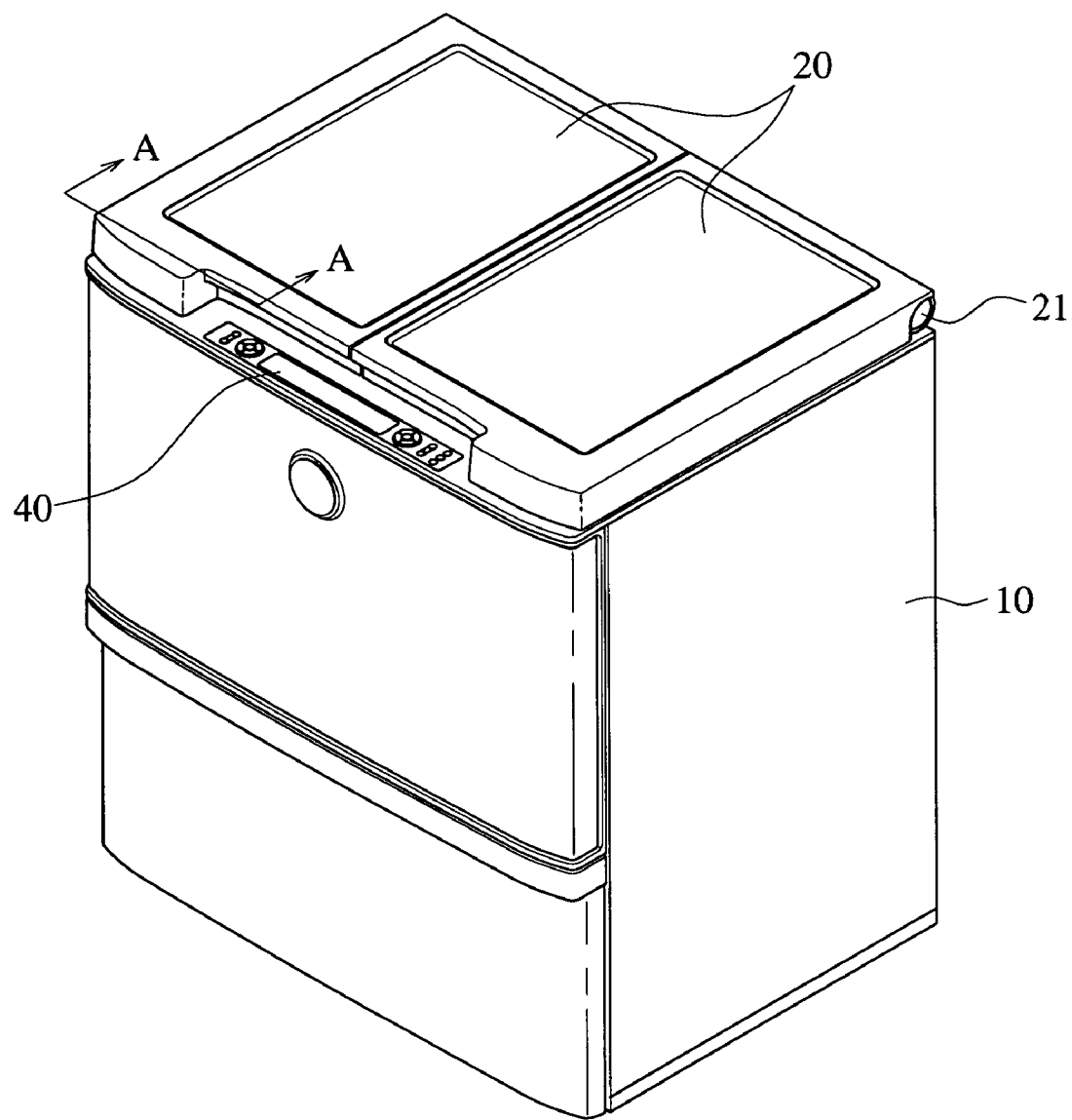
FIG. 4 is a perspective view showing a Kimchi storage facility to which the present invention.

FIG. 4 is a perspective view showing a Kimchi storage facility to which the present invention. As shown in FIG. 4, a Kimchi storage facility according to the present invention includes at least one storage chamber 30 in a main body 10 having an external appearance of a predetermined shape, and at least one door 20 which is located in the upper portion of the storage chamber 30 and coupled by at least one hinge 21 in the upper-rear end of the main body 10, in order to open and close the at least one storage chamber 30 upwards. Also, a display manipulator 40 having a number of buttons which can control Kimchi stored in the storage chamber 30 to be kept in store or ripened is installed in the upper-front portion of the main body 10.

Figure 5:
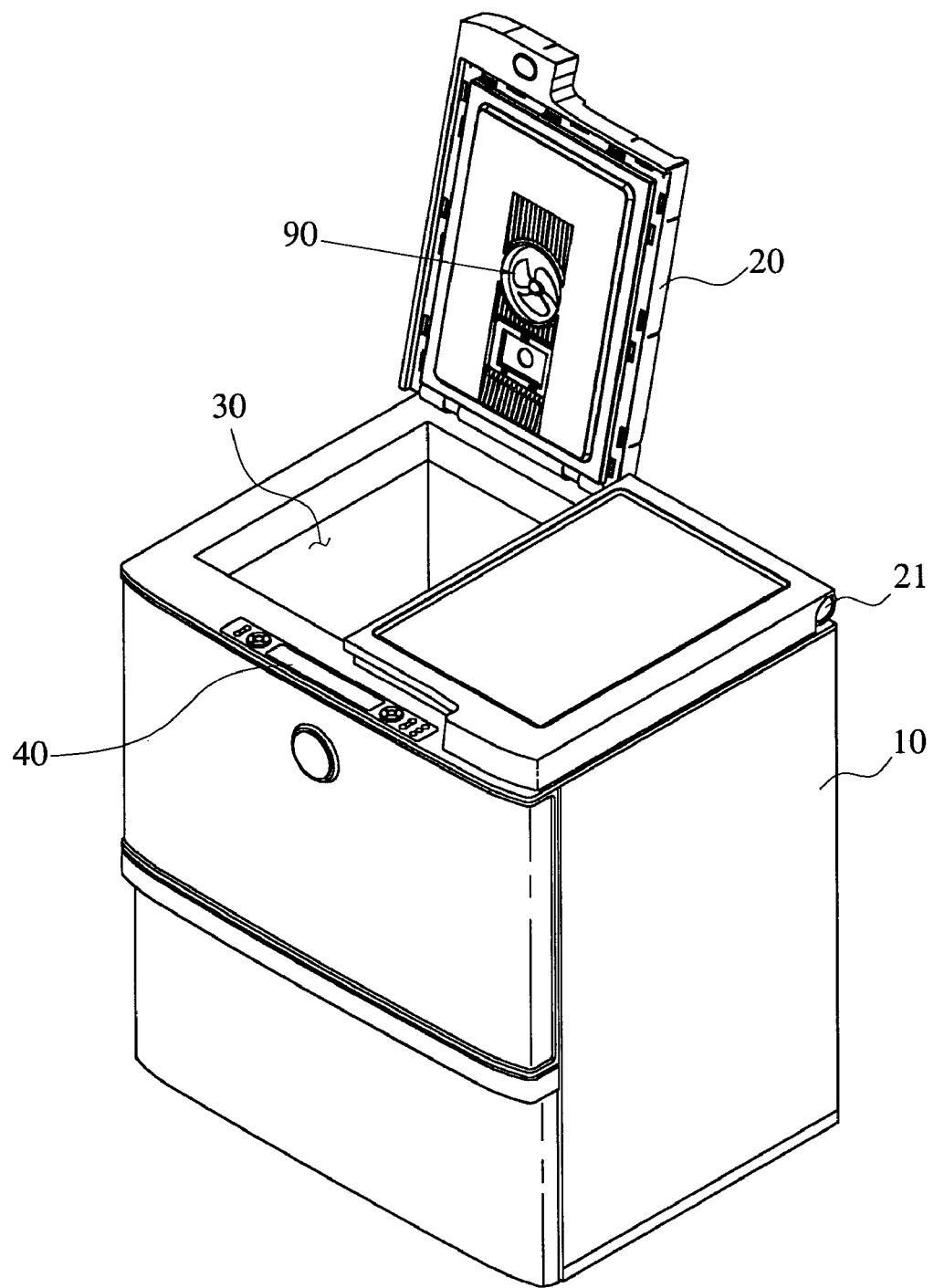
FIG. 5 is a perspective view showing a state where a fan is mounted on a door in a Kimchi storage facility according to a first embodiment of the present invention.
Figure 6:
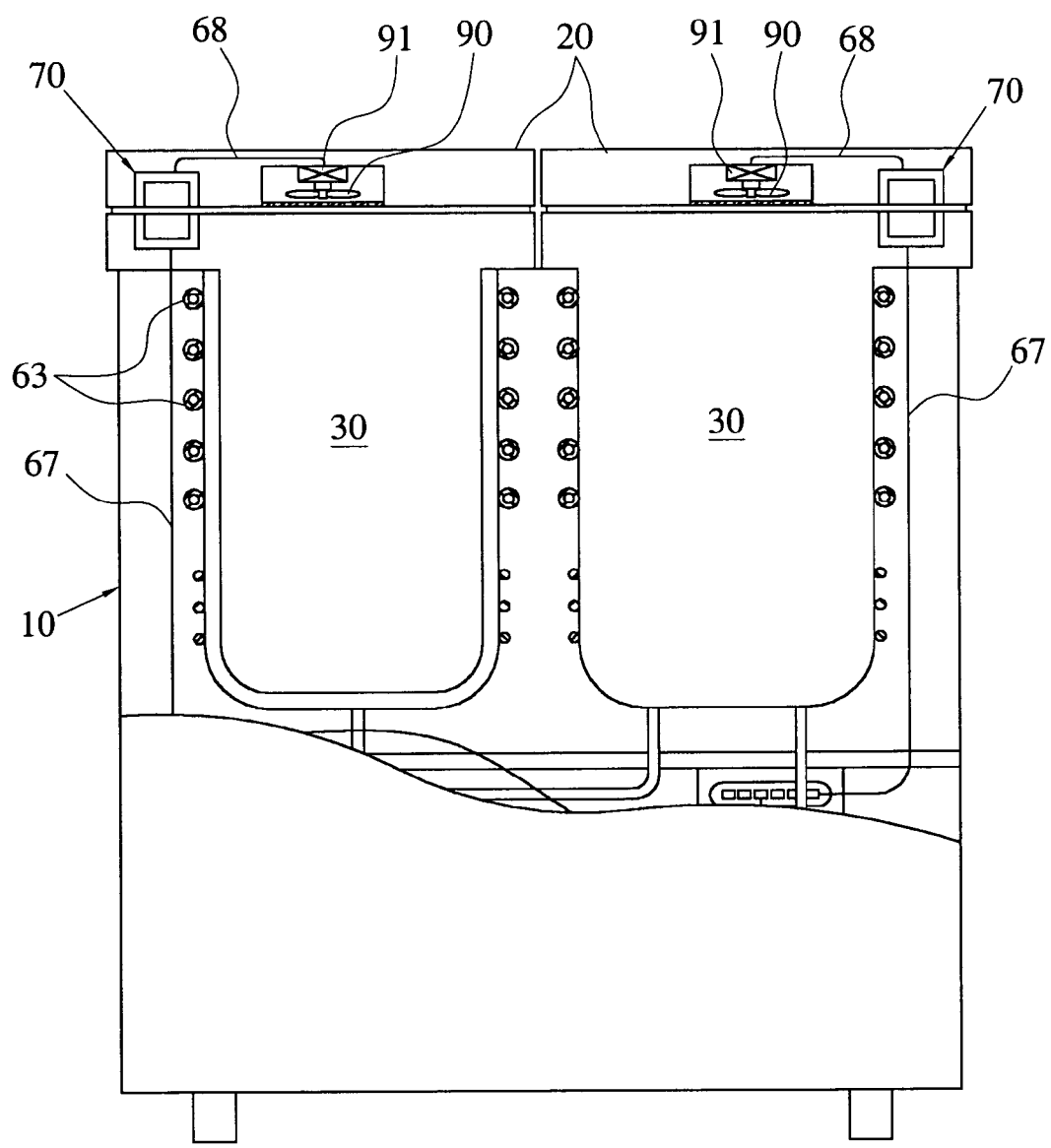
FIG. 6 is an exploded cross-sectional view schematically showing a state where a driving motor and a fan are installed on a door in the Kimchi storage facility according to the first embodiment of the present invention.
Figure 7:
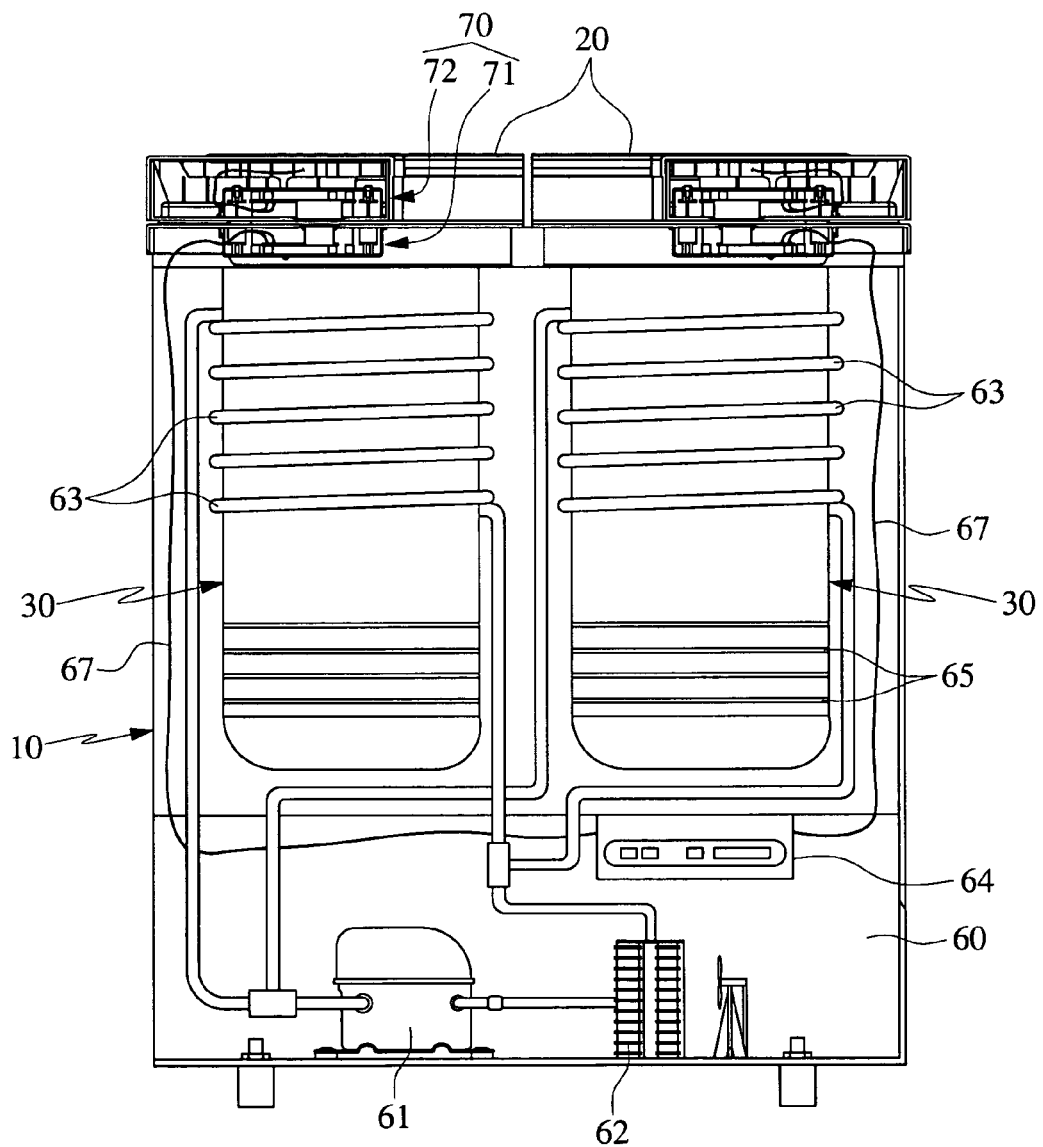
FIG. 7 is a cross-sectional view showing an internal structure of the Kimchi storage facility in which a non-contact power supply device is installed according to the first embodiment of the present invention.

FIG. 5 is a perspective view showing a state where a fan is mounted on a door in a Kimchi storage facility according to a first embodiment of the present invention. FIG. 6 is an exploded cross-sectional view schematically showing a state where a driving motor and a fan are installed on a door in the Kimchi storage facility according to the first embodiment of the present invention. FIG. 7 is a cross-sectional view showing an internal structure of the Kimchi storage facility in which a non-contact power supply device is installed according to the first embodiment of the present invention.

Also, in the Kimchi storage facility according to the first embodiment of the present invention as shown in FIGS. 5 through 7, a mechanic room 60 partitioned from the storage chamber 30 is formed in the lower portion inside the main body 10. Here, in the mechanic room 600 are mounted elements configuring a basic cooling cycle including a compressor 61, a condenser 62, a capillary tube (not shown), an evaporator 63, and so on for circulating the coolant over the storage chamber 30 and the mechanic room 60.

Also, a control unit 64 is mounted in a control box in the mechanic room 60. The control unit 64 is connected to the display manipulator 40, and includes a printed circuit board (PCB) substrate on which various chips and circuits are formed, in order to control the overall operations of the Kimchi storage facility.

Here, in the control box is mounted a power supply (not shown) which supplies the Kimchi storage facility as well as the control unit 64 with electric power.

Also, coolant pipe which forms the evaporator 63 is wounded around the outer wall in the storage chamber 30. Also, a ripening heater 65 which heats the storage chamber 30 is wound below the coolant pipe. Also, a temperature sensor (not shown) which detects temperature of the storage chamber 30 and controls the temperature in the storage chamber 30 is installed between the evaporator 63 and the coolant pipe.

In the Kimchi storage facility according to the first embodiment of the present invention having the general structure, a fan 90 is installed in the central bottom of the door 20 so that cold air supplied to the storage chamber 30 is forcedly convected and uniformly distributed, to thereby improve the temperature deviation between the upper and lower portions in the storage chamber 30, and a driving motor 91 is installed in the door 20 in order to drive the fan 90.

The Kimchi storage facility according to the first embodiment of the present invention includes a non-contact power supply device 70 to use an induced electromotive force, when power is supplied in order to drive the fan 90 provided in the door 20.

That is, the non-contact power supply device 70 according to the present invention includes a first coil unit 71 installed toward the main body 10 and a second coil unit 72 installed toward the door 20. Here, an induced electromotive force is generated between the first and second coil units 71 and 72, to thus supply power for the driving motor 91 and the fan 90 in the door 20.

Figure 8:
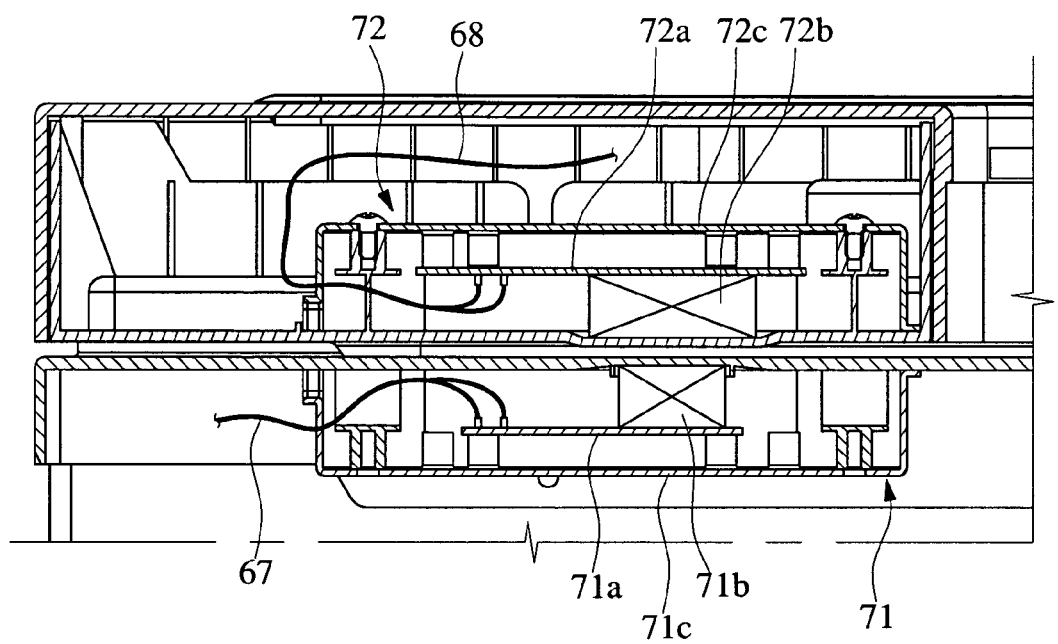
FIG. 8 is a cross-sectional view of line of A—A FIG. 4 showing a structure of a non-contact power supply device according to the present invention.

FIG. 8 is a cross-sectional view of line A—A of FIG. 4 showing a structure of a non-contact power supply device according to the present invention.

In more detail, as shown in FIG. 8, the non-contact power supply device 70 includes a first coil unit 71 which receives power from a power supply (not shown) provided in the mechanic room 60 via a cable 67, and which is mounted in the upper portion of the main body 10 which closely contacts the door 20, and a second coil unit 72 which is mounted in the leading end of the door 20 in correspondence to the first coil unit 71.

Here, the first coil unit 71 in the non-contact power supply device 70 includes a first printed circuit board (PCB) substrate 71a which is accommodated in a space enclosed by a lower protection cover 71c at one side of the upper portion of the main body 10, and a bobbin 71b which is connected to the first PCB substrate 71a and around which coil is wound. The first coil unit 71 is connected to the power supply provided in the mechanic room 60 via a cable 67 to receive alternating current power.

Here, it is preferable that a shield plate (not shown) is installed below the bobbin 71b in the first coil unit 71, in order to intercept influences from an external electric or magnetic field.

Also, as shown in FIGS. 7 and 8, the second coil unit 72 in the non-contact power supply device 70 includes a second printed circuit board (PCB) substrate 72a which is accommodated in a space enclosed by an upper protection cover 72c installed in the door 20 so that induced current can be generated by electromagnetic induction against the first coil unit 71, and a bobbin 72b which is connected to the second PCB substrate 72a and around which coil is wound. The second coil unit 72 is connected to the driving motor 91 installed in the door 20 by a cable 68 to supply the driving motor 91 with power.

In particular, the first and second coil units 71 and 72 are disposed to maintain an interval of about 5 mm to 10 mm, when the leading end of the door 20 and the upper end of the main body 10 closely contact each other, that is, in the case that the door 20 is closed to seal the storage chamber 30.

That is, the first and second coil units 71 and 72 are designed to have an interval in which electromagnetic induction can occur sufficiently between the first and second coil units 71 and 72.

In the case that the first coil unit 71 installed in the main body 10 is distant far away from the second coil unit 72 installed in the door 20, that is, at a state where the door 20 is opened to open the storage chamber 30, electromagnetic induction does not occur even if power is supplied to the first coil unit 71.

Figure 9:
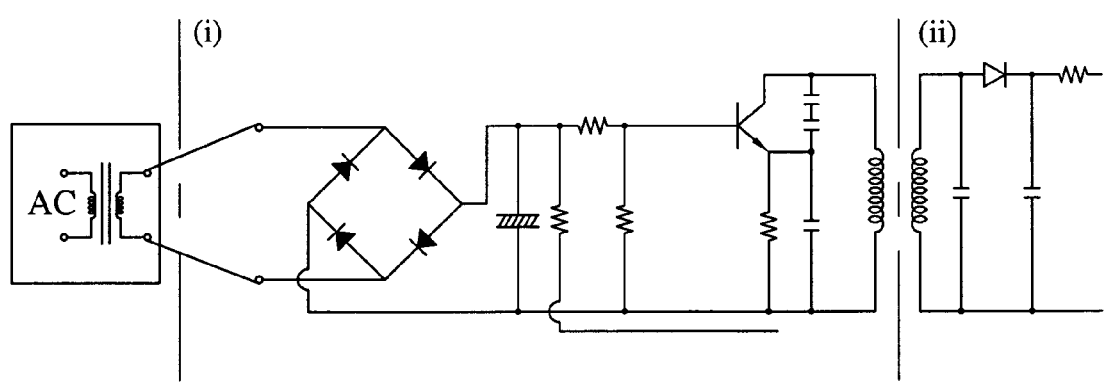
FIG. 9 is a circuitry diagram showing a printed circuit board (PCB) constituting a first coil unit and a second coil unit in the non-contact power supply device according to the present invention.

FIG. 9 is a circuitry diagram showing a printed circuit board (PCB) constituting a first coil unit and a second coil unit in the non-contact power supply device according to the present invention.

Also, a circuit shown in FIG. 9 is formed in the PCB substrates 71a and 72a configuring the first and second coil units 71 and 72, respectively.

That is, a circuit (i) of FIG. 9 is formed in the PCB substrate 71a of the first coil unit 71, and a circuit (ii) of FIG. 9 is formed in the PCB substrate 72a of the second coil unit 72. Accordingly, when power is applied to the first coil unit 71 from the power supply in the main body 10, the alternating current power applied to the first coil unit 71 is electromagnetically induced to the second coil unit 72, so that induced current flows on the circuit of the second coil unit 72.

A process of transferring power via the non-contact power supply device 70 will be described below. When power is supplied via the cable 67 from the power supply in the mechanic room 60 to the first coil unit 71 at a state where the door 20 is closed, electromagnetic induction occurs between the first and second coil units 71 and 72 according to the Faraday's law, and induced current is generated on the circuit of the second coil unit 72 by an induced electromotive force.

Here, a magnitude of the induced electromotive force which occurs in the coil according to the Faraday's law is determined by a temporal change rate of magnetic flux passing thorough the coil. If a motion of a magnet becomes faster, an intensity of the induced current increases.

That is, if circular coil is wound by N-turns and magnetic flux passing through each coil ring is changed by $\Delta\Phi$ for time $\Delta t$, an average electromotive force E induced in the coil for time $\Delta t$ becomes $-N\Delta t/\Delta\Phi$. That is, $E=-N\Delta t/\Delta\Phi$.

Thus, when current i flowing through a first coil between two adjacent coils is changed, the number of a magnetic flux passing through a second coil is changed. An induced electromotive force is produced in the second coil, which is called mutual induction.

Here, the electromotive force induced in the second coil is proportional to the temporal change rate of current flowing through the first coil $\Delta i/\Delta t$.

As described above, when a non-contact power supply device is installed using the Faraday's law, a cable need not be connected between the main body 10 and the door 20. That is, power from the power supply provided in the main body 10 can be transferred toward the door 20.

As described above, according to the first embodiment of the present invention, the first and second coil units 71 and 72 are separated from each other, in which the first coil unit 71 is installed in the main body 10 and the second coil unit 72 is installed in the door 20, so that power can be supplied to the driving motor 91 which drives the fan 90 by induced electromotive force.

The operations and effects of the driving motor and the fan which are installed in the door using the non-contact power supply device according to the first embodiment of the present invention will be described below.

First, when the main body 10 and the door 20 are assembled with each other, the first and second coil units 71 and 72 which are protected by protection covers 71c and 72c, respectively are mounted in the upper end of the main body 10 and the leading end of the door 20, respectively which oppose each other.

Also, a cable 67 is connected through the inside of the main body 10 between the first coil unit 71 and the power supply in the mechanic room 60. Accordingly, power (alternating current power) is supplied from the power supply to the first coil unit 71.

Also, a cable 68 is connected through the inside of the door 20 between the second coil unit 72 and the driving motor 91, so that power (alternating current power) is supplied from the second coil unit 72 to the driving motor 91.

Here, the cable 68 wired through the door 20 is wired during assembly of the door 20 and then buried by a foaming agent in the door 20.

Also, the fan 90 is installed on the bottom of the door 20 at a state where the fan 90 is connected to the driving motor 91 and is made to rotate by the driving force of the driving motor 91.

The operation of the fan will be described below at a state where the non-contact power supply device, the driving motor and the fan have been completely installed in the door according to the first embodiment of the present invention.

First, in the case that cold air is supplied into the storage chamber 30 by the operation of the cooling cycle at a state where the door 20 has been closed, an alternating current power is applied to the first coil unit 71 located in the upper portion of the main body 10 from the power supply in the mechanic room 60 via the cable 67 under the control of the control unit 64.

Accordingly, electromagnetic induction occurs in the second coil unit 72 located toward the door 20 corresponding to the first coil unit 71, by the Faraday's law. As a result, an induced electromotive force is generated on the circuit of the second coil unit 72, and induced current flows on the circuit of the second coil unit 72 by the induced electromotive force, to thereby transfer power from the first coil unit 71 to the second coil unit 72.

Also, the induced current on the circuit of the second coil unit 72 is transferred to the driving motor 91 via the cable 68. Accordingly, the driving motor 91 is driven by the transferred induced current to make the fan 90 rotate.

Meanwhile, when the door 20 is opened, the fan 90 stops rotating.

That is, when the door 20 is opened, the interval between the first coil unit 71 and the second coil unit 72 in the non-contact power supply device 70 becomes farther. As a result, electromagnetic induction does not occur and thus power transferring stops. Finally, since power is not supplied to the driving motor 91, the fan 90 stops rotating.

Of course, when the door 20 is opened, the fan stops rotating. However, in the case that the fan 90 is intended to stop rotating even at a state where the door 20 is not opened, power from the power supply should be made to stop.

That is, when a user controls the control unit 64 via the display manipulator 40, power supplied from the power supply to first coil unit 71 stop is compulsively made to stop. Otherwise, when a predetermined set condition is met through experimental data capable of identifying improvement of the temperature deviation in the storage chamber 30 by considering the entire performance of a Kimchi storage facility which has a function of reducing a power consumption, power can be set to stop automatically under the control of the control unit 64 after the fan 90 rotates for a certain time.

As described above, according to the first embodiment of the present invention, power is supplied to the driving motor 91 installed in the door 20 from the power supply in the main body 10 to make the fan 90 rotate, without using a separate power supply unit which is connected to the driving motor 91 by wire. Accordingly, the fan 90 is driven to make cold air in the storage chamber 30 forcedly circulated. As a result, the Kimchi storage facility according to the present invention is relatively easily fabricated and installed in comparison with the case that the separate power supply unit is connected to the driving motor 91 by wire between the main body 10 and the door 20. Also, the Kimchi storage facility according to the present invention can protect users from dangers which may happen during use of the Kimchi storage facility, and make it possible to neatly finish treatment of the cable between the door and. the main body. Accordingly, the present invention provides an effect of heightening a consumer's purchasing desire.

Figure 10:
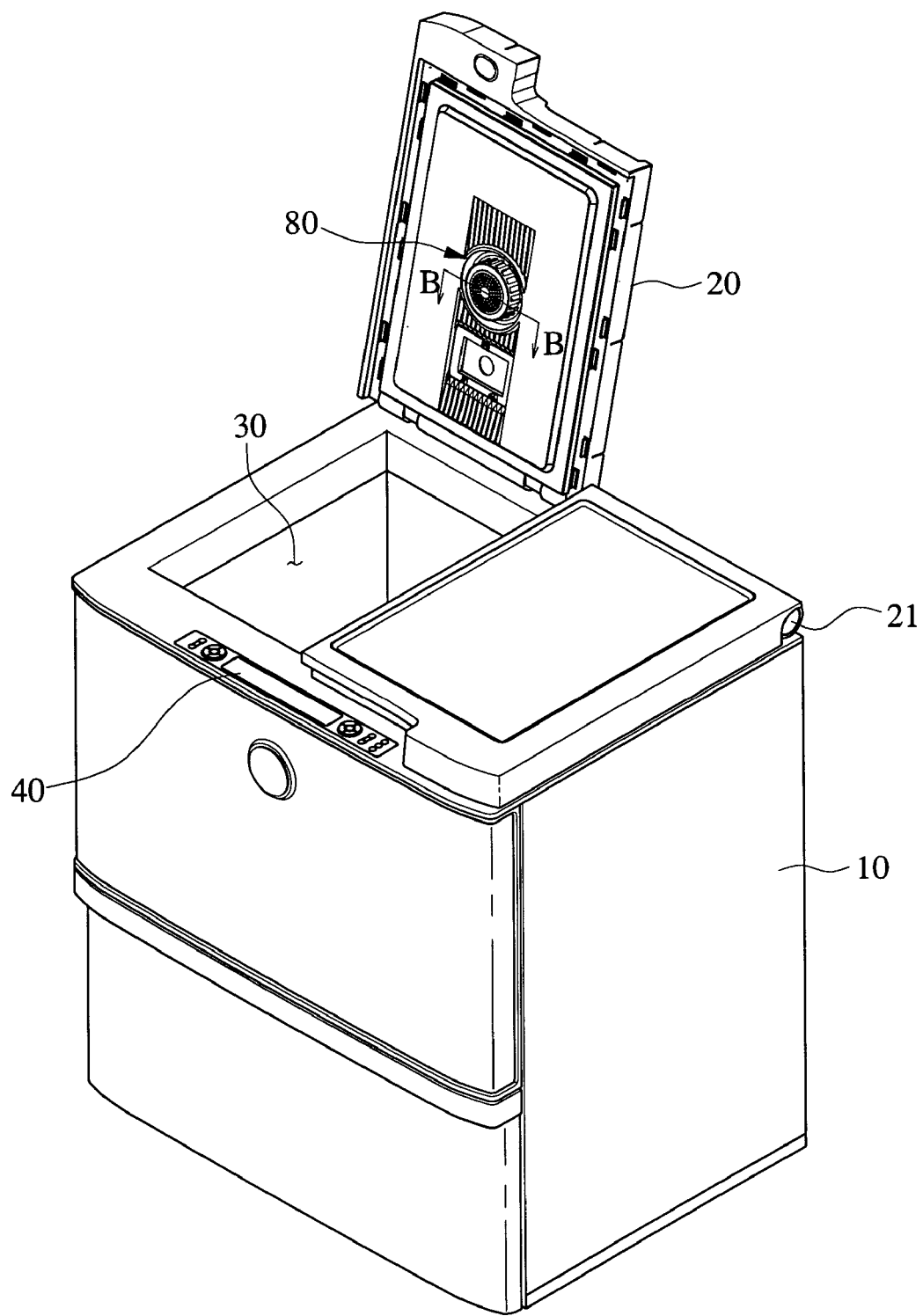
FIG. 10 is a perspective view showing a state where a fan accommodation case is mounted on a door in a Kimchi storage facility according to a second embodiment of the present invention.
Figure 11:
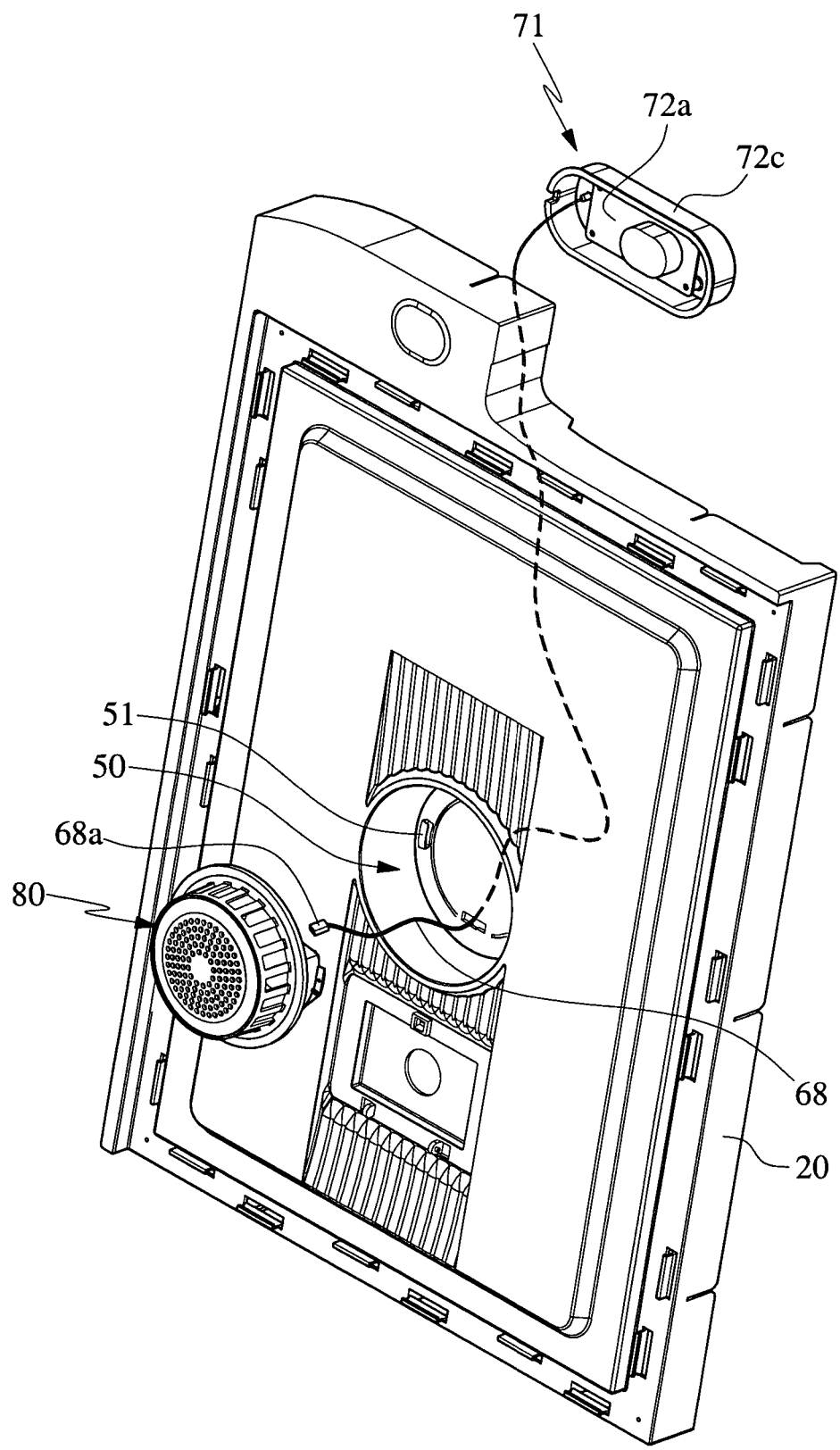
FIG. 11 is a perspective view showing a state where a fan accommodation case and a second coil unit are mounted on a door according to a second embodiment of the present invention.

FIG. 10 is a perspective view showing a state where a fan accommodation case is mounted on a door in a Kimchi storage facility according to a second embodiment of the present invention. FIG. 11 is a perspective view showing a state where a fan accommodation case and a second coil unit are mounted on a door according to a second embodiment of the present invention.

Meanwhile, as shown in FIGS. 10 and 11, according to a second aspect of the present invention, a fan accommodation case 80 accommodating a rotating fan (83 of FIG. 13) which rotates in a magnetic levitation rotation manner is installed on the bottom of a door 20, instead of a driving motor 91 and a fan 90 which are employed in the first aspect of the present invention.

That is, in addition to the structure of the general Kimchi storage facility shown in FIG. 4, the Kimchi storage facility according to the second embodiment of the present invention includes a rotating fan 83 (FIG. 13) which is accommodated and supported in a fan accommodation case 80 and rotates in a magnetic levitation rotation manner, and which is installed on the central bottom of a door 20 to thereby forcedly circulate cold air supplied to a storage chamber 30 via a cooling cycle in order to improve a temperature deviation in the storage chamber 30. Also, the Kimchi storage facility according to the second embodiment of the present invention includes a non-contact power supply device 70 between the main body 10 and the door 20 in order to drive the rotating fan 83.

Here, as shown in FIG. 11, a mount portion 50 in which the fan accommodation case 80 accommodating the rotating fan 83 can be mounted, is provided on the central bottom of the door 20. In the mount portion 50 is provided a guide fitter 51 corresponding to a fitting guide 88a in the fan accommodation case 80 to be described later in order to assemble and mount the fan accommodation case 80 therein without assistance of any separate fitting tool.

Also, the non-contact power supply device 70 includes a first coil unit 71 which is connected to a power supply (not shown) provided in the mechanic room 60 by a cable 67 to receive electric power and mounted in the upper portion of the main body 10 closely contacting the door 20, and a second coil unit 72 which is mounted in the leading end of the door 20 in correspondence to the first coil unit 71, which has the same structure as that of the non-contact power supply device 70 according to the first embodiment of the present invention.

Thus, the detailed description of the structure of the non-contact power supply device 70 according to the second embodiment of the present invention will be omitted. The technical features of the non-contact power supply device 70 according to the first embodiment of the present invention will be referred to as those of the non-contact power supply device according to the second embodiment of the present invention.

Only a minor difference between the non-contact power supply devices 70 according to the first and second embodiments of the present invention, resides in the fact that the second coil unit 72 in the second embodiment of the present invention is connected to an electromagnets portion 87 in a magnetic levitation unit to be described later in order to drive the rotating fan 83 by a cable 68, so that power can be supplied to the electromagnets portion 87.

Here, a connector 68a is provided in the end of the cable 68 so that the cable 68 can be easily connected to the electromagnets accommodation portion 87.

Meanwhile, the rotating fan 83 which is driven induced current via the non-contact power supply device 70 according to the second embodiment of the present invention, is installed in a mount portion 50 provided on the central bottom of the door 20 at a state where the rotating fan 83 is freely rotatably in the fan accommodation case 80 provided with a magnetic levitation unit.

Figure 12:
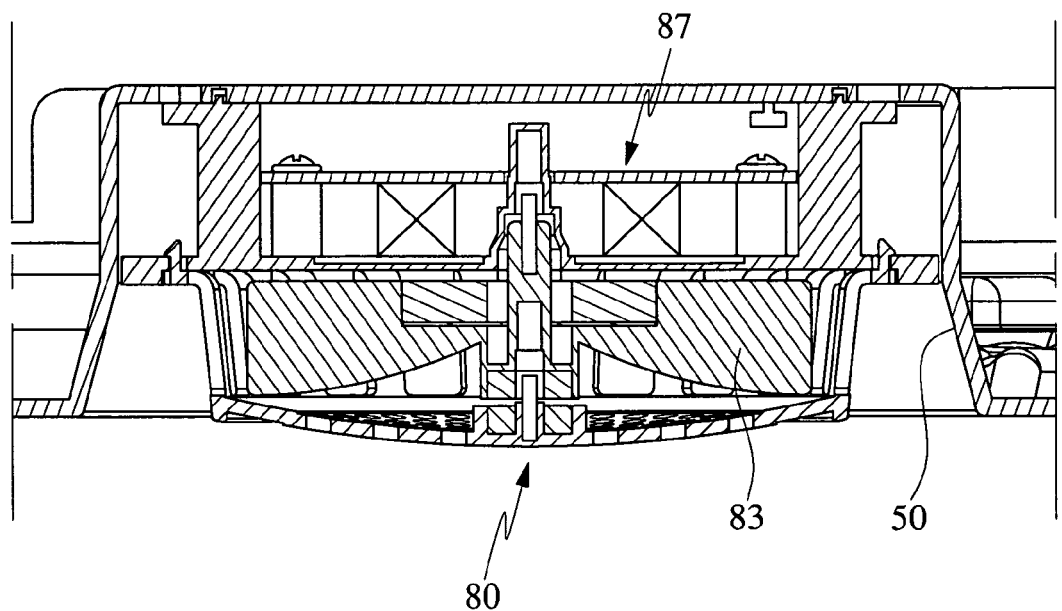
FIG. 12 is a cross-sectional view of line B—B of FIG. 10 showing a structure of a fan accommodation case mounted on a door in a Kimchi storage facility according to the present invention.
Figure 13:
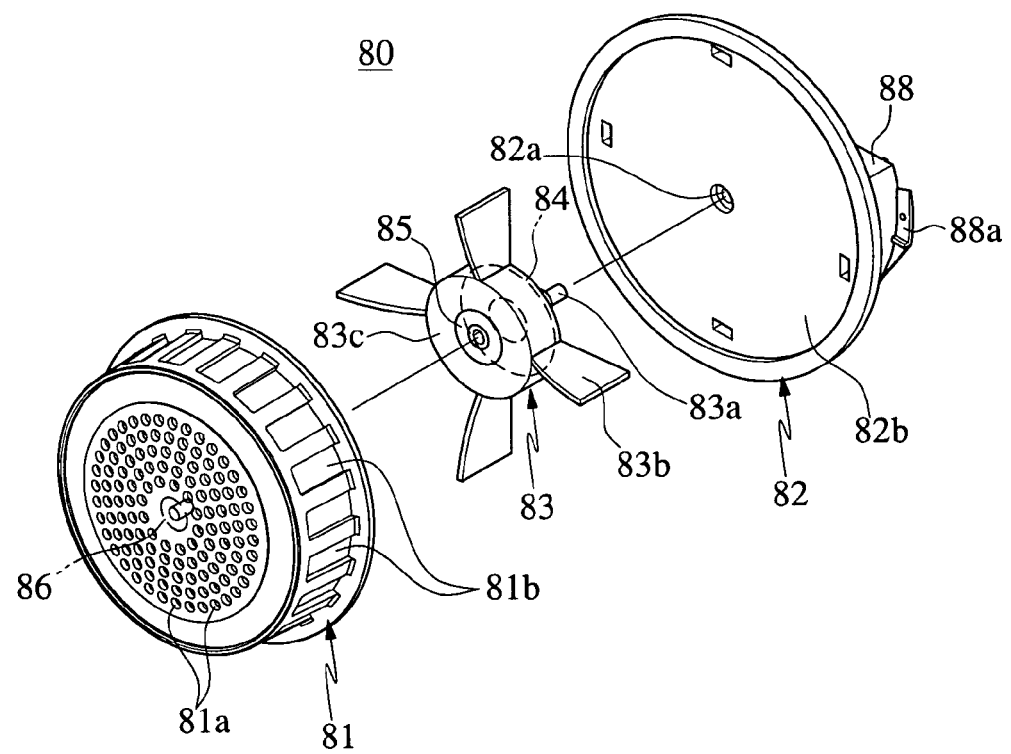
FIG. 13 is a perspective view showing a structure of a fan accommodation case and a rotating fan in a Kimchi storage facility, according to the present invention.

FIG. 12 is a cross-sectional view of line B—B of FIG. 10 showing a structure of a fan accommodation case mounted on a door in a Kimchi storage facility according to the present invention. FIG. 13 is a perspective view showing a structure of a fan accommodation case and a rotating fan in a Kimchi storage facility, according to the present invention.

Here, as shown in FIGS. 12 and 13, the rotating fan 83 includes a wing portion 83b having a plurality of rotating wings, a cylindrical body 83c to which the wing portion 83b is integrally fixedly supported, and a rotating axis 83a which protrudes at the center of the cylindrical body 83c.

The fan accommodation case 80 includes a cap-shaped fan cover 81 in which the rotating fan 83 is accommodated, and a base cover 82 which is fitted with the fan cover 81 and mounted in a mount portion 50 provided on the bottom of the door 20.

Figure 15:
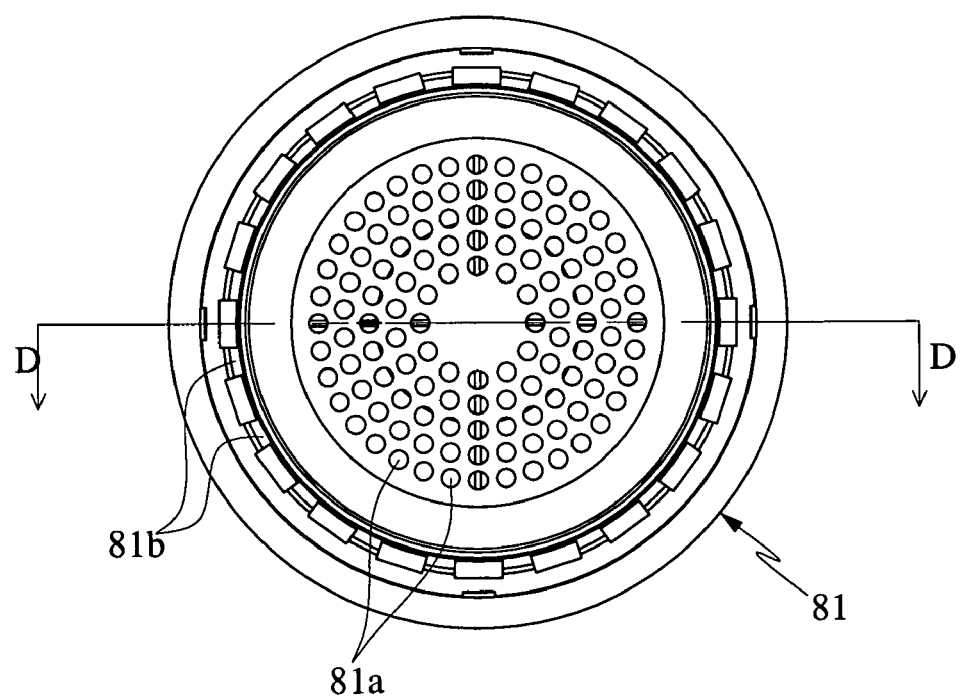
FIG. 15 is a bottom view of the fan accommodation case according to the second embodiment of the present invention.

FIG. 15 is a bottom view of the fan accommodation case according to the second embodiment of the present invention.

Here, as shown in FIG. 15, a plurality of inhaling holes 81a are formed on the bottom of the fan cover 81 and a plurality of discharging holes 81b are formed on the lateral surfaces of the fan cover 81, so that cold air in the storage chamber 30 can be inhaled and discharged, during rotation of the rotating fan 83 at a state where the rotating fan 83 is accommodated and supported.

Also, a third permanent magnet 86 in a magnetic levitation unit to be described later is mounted on the central inner wall of the fan cover 81.

Figure 16:
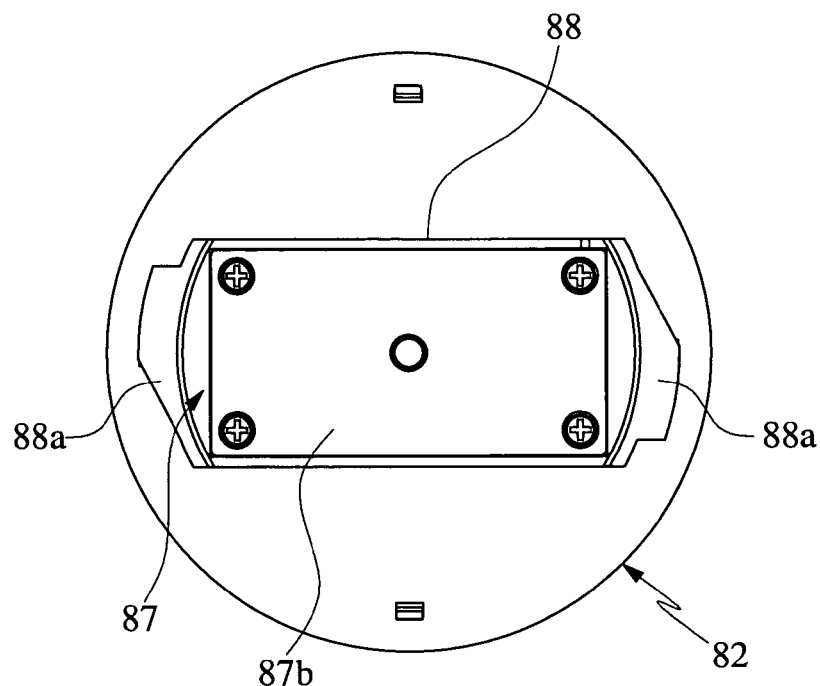
FIG. 16 is a plan view of the fan accommodation case according to the second embodiment of the present invention.

FIG. 16 is a plan view of the fan accommodation case according to the second embodiment of the present invention.

Also, as shown in FIG. 16, the base cover 82 includes a cover surface 82b which blocks the upper opening of the fan cover 81 and a support hole 82a through which the rotational axis 83a of the rotating fan 83 is inserted freely rotatably at the center of the cover surface 82b, in which a substantially rectangular electromagnets accommodation unit 88 accommodating the electromagnets 87 of the magnetic levitation unit to be described later is provided on the cover surface 82b facing the support hole 82a.

Here, a plurality of flange-shaped fitting guides 88a which are mutually symmetrically disposed are provided on the outer circumferential surface of the electromagnets accommodation portion 88 in the base cover 82. Also, the fan accommodation case 80 can be easily detachably installed on the bottom of the door 20, by configuration of the fitting guide 88a and the base cover 82 in which the base cover 82 is turned and fitted with the guide fitting portion 51 provided in the mount portion 50 on the bottom of the door 20 via the fitting guide 51.

Also, the fan cover 81 and the base cover 82 are simply fitted with each other in an assembly manner of a hook 89.

Of course, it is possible to connect between the fan cover 81 and the base cover 82 with screws via the contact surfaces between the fan cover 81 and the base cover 82. However, the assembly with the hook 89 facilitates connection and disconnection between the fan cover 81 and the base cover 82 without any assistance of particular tools.

Figure 14:
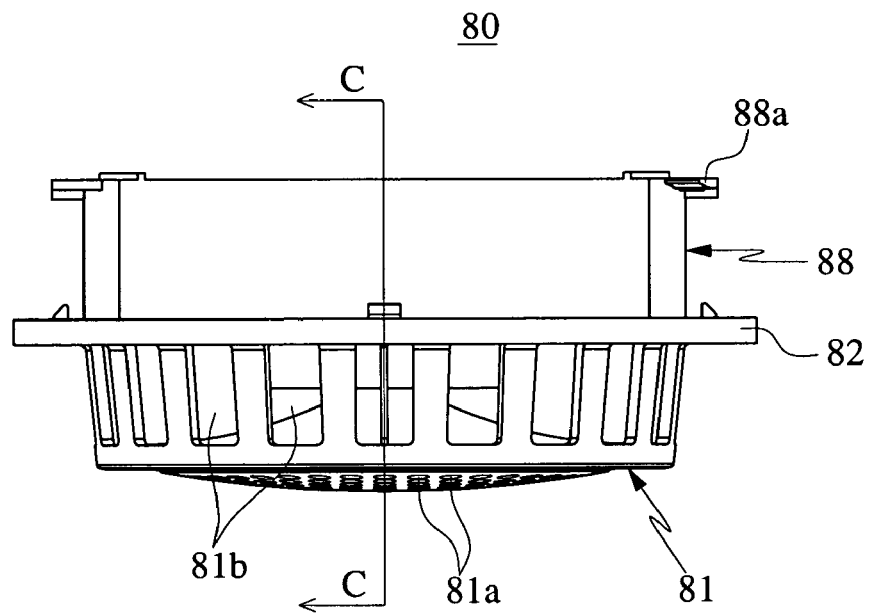
FIG. 14 is a side view showing a fan accommodation case according to the second embodiment of the present invention.
Figure 17:
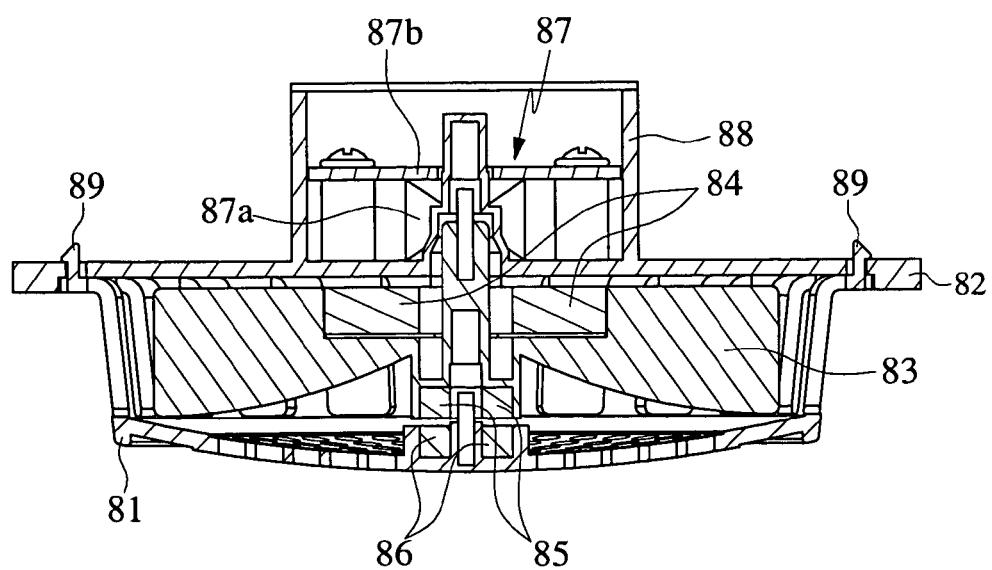
FIG. 17 is a cross-sectional view cut along line C—C of FIG. 14 showing a structure of the fan accommodation case according to the second embodiment of the present invention.
Figure 18:
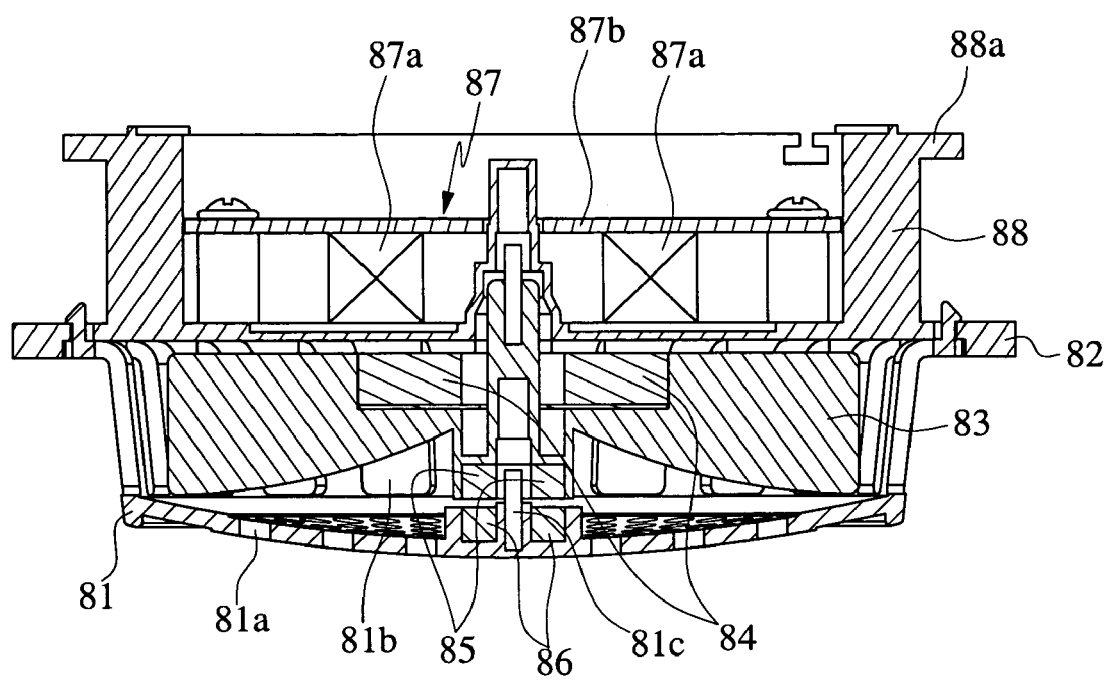
FIG. 18 is a cross-sectional view cut along line D—D of FIG. 15 showing a structure of the fan accommodation case according to the second embodiment of the present invention.

FIG. 17 is a cross-sectional view cut along line C—C of FIG. 14 showing a structure of the fan accommodation case according to the second embodiment of the present invention. FIG. 18 is a cross-sectional view cut along line D—D of FIG. 15 showing a structure of the fan accommodation case according to the second embodiment of the present invention.

Meanwhile, as shown in FIGS. 17 and 18, the magnetic levitation unit provided in the fan accommodation case 80 according to the present invention includes a plurality of electromagnets 87 which are connected to the second coil unit 72 in the non-contact power supply device 70 by wire 68 to generate an electromagnetic force at a state where polarities of N-pole and S-pole are separated individually, a third permanent magnet 86 which is installed on the central inner wall of the bottom of the fan cover 81 in the fan accommodation case 80, a first permanent magnet 84 and a second permanent magnet 85 which are respectively mounted on either side surface of the rotating fan 83, so that a repulsive force is generated correspondingly between the plurality of electromagnets 87 and the third permanent magnet 86.

Here, the plurality of electromagnets 87 has a structure that a plurality of bobbins 87a around which coil is wound at a certain interval are installed on a single PCB substrate 87b in which circuits are formed.

Here, when the plurality of bobbins 87a are magnetized by an applied power, mutually different polarities of N-poles and S-poles are formed by the printed circuit structure on the PCB substrate 87b and the coil winding direction.

Also, the plurality of electromagnets 87 and the first permanent magnet 84, as well as the second and third permanent magnets 85 and 86 are disposed correspondingly each other. Also, the above magnets 87, 84, 85 and 86 are disposed so that a mutual repulsive force interacts due to the same polarity therebetween.

Thus, the rotating fan 83 which is freely rotatably installed between the electromagnets 87 in the base cover 82 and the third permanent magnet 86 in the fan cover 81 is floated in a magnetic levitation rotation manner.

Here, it is preferable that a cylindrical permanent maget in which N-poles and S-poles are repeatedly magnetized is used as the first permanent magnet 84.

The reason why a cylindrical permanent maget in which N-poles and S-poles are repeatedly magnetized is used as the first permanent magnet 84, is to make the rotating fan 83 receive a rotational force in a direction due to the repeatedly magnetized N and S polarities of the first permanent magnet 84 and rotate, at a state where a mutual repulsive force interacts to push out each other, when the first permanent magnet 84 correspondingly disposed with respect to the plurality of electromagnets 87 is magnetized into the same polarities against the electromagnets 87 at a state where the plurality of electromagnets 87 are separately formed into the polarities of N-pole and S-pole by the circuit structure.

The operations and effects of the non-contact power supply device and the rotating fan rotating in a magnetic levitation rotation manner according to the second embodiment of the present invention will be described below.

First, when the main body 10 and the door 20 are assembled with each other, the first and second coil units 71 and 72 which are protected by protection covers 71c and 72c, respectively are mounted in the upper end of the main body 10 and the leading end of the door 20, respectively which oppose each other.

Also, a cable 67 is connected through the inside of the main body 10 between the first coil unit 71 and the power supply in the mechanic room 60. Accordingly, power (alternating current power) is supplied from the power supply to the first coil unit 71.

Also, a cable 68 is connected through the inside of the door 20 between the second coil unit 72 and the electromagnets 87 in the fan accommodation case 80, so that power (alternating current power) is supplied from the second coil unit 72 to the electromagnets 87. A connector 68a is provided in the end of the cable 68, in order to connect between the second coil unit 72 and the electromagnets 87 in the fan accommodation case 80 via the connector 68a when the fan accommodation case 80 is mounted in the mount portion 50 provided on the bottom of the door 20, to thereby make connection of the cable 68 very easy.

Here, the cable 68 wired through the door 20 is wired during assembly of the door 20 and then buried by a foaming agent in the door 20.

Meanwhile, in the fan accommodation case 80 which is mounted in the mount portion 50 provided on the bottom of the door 20, the fan cover 81 is simply fitted into the base cover 82 with hooks 89 at a state where the rotating fan 83 is accommodated and supported between the fan cover 81 and the base cover 82. In this state, the fan accommodation case 80 is turned and fitted into the guide fitter 51 in the mount portion 50 via the fitting guide 88a provided on the outer circumferential surface of the electromagnets accommodation portion 88 in the base cover 82. Accordingly, the fan accommodation case 80 is simply and easily mounted in the mount portion 50 provided on the bottom of the door 20.

Here, in the process of mounting the fan accommodation case 80, the cable 68 is firstly connected between the second coil unit 72 and the electromagnets 87 in the fan accommodation case 80 to supply power. As described above, the cable 68 is connected via the connector 68a to thereby accomplish the connection simply.

Also, when the rotating fan 83 is accommodated and supported between the fan cover 81 and the base cover 82, the rotational axis 83a of the rotating fan 83 is freely and rotatably inserted into the support hole 82a formed in the base cover 82, and the counter portion of the rotational axis 83a inserted into the support hole 82a is fitted with the support axis 81c protruded on the central inner wall of the bottom of the fan cover 81, in which both ends of the rotational axis 83a in the rotating fan 83 is supported and fixed. Accordingly, the rotating fan 83 is floated between the fan cover 81 and the base cover 82 in a magnetic levitation rotation manner, and receives a rotational force to rotate.

The operation of the rotating fan will be briefly described below at a state where the non-contact power supply device the fan accommodation case have been completely installed according to the present invention.

First, in the case that cold air is supplied into the storage chamber 30 by the operation of the cooling cycle at a state where the door 20 has been closed, an alternating current power is applied to the first coil unit 71 located in the upper portion of the main body 10 from the power supply in the mechanic room 60 via the cable 67 under the control of the control unit 64.

Accordingly, electromagnetic induction occurs in the second coil unit 72 located toward the door 20 corresponding to the coil unit 71, by the Faraday's law. As a result, an induced electromotive force is generated on the circuit of the second coil unit 72, and induced current flows on the circuit of the second coil unit 72 by the induced electromotive force, to thereby transfer power from the first coil unit 71 to the second coil unit 72.

Also, the induced current on the circuit of the second coil unit 72 is transferred to the electromagnets 87 in the fan accommodation case 80 via the cable 68. Accordingly, the plurality of electromagnets 87 are divided and magnetized into polarities of N-pole and S-pole due to the induced current.

Thus, when the electromagnets 87 are magnetized to thus have a magnetic force, a repulsive force is generated due to the same polarity against the first permanent magnet 84 in the rotating fan 83 to make the electromagnets 87 and the first permanent magnet 84 push out each other. Simultaneously, a repulsive force pushing out the rotating fan 83 is applied between the second permanent magnet 85 in the rotating fan 83 and the third permanent magnet 86 in the fan cover 81, in a direction opposing the direction of pushing out the rotating fan 83 by the repulsive force between the electromagnets 87 and the first permanent magnet 84. As a result, the rotating fan 83 is floated between the fan cover 81 and the base cover 82 in a magnetic levitation rotation manner.

Here, an intensity of the repulsive force formed between the electromagnets 87 and the first permanent magnet 84 and an intensity of the repulsive force formed between the second permanent magnet 85 and the third permanent magnet 86, are designed to maintain a magnetic levitation state of the rotating fan 83.

Meanwhile, since the rotating fan 83 is floated at a freely rotatable state, in a magnetic levitation rotation manner, and the circular first permanent magnet 84 is repeatedly magnetized into polarities of N-pole and S-pole, the rotating fan 83 is subject to receive a rotational force in a random direction in the push-out process due to the repulsive force applied between the electromagnets 87 and the first permanent magnet 84.

Here, when the rotating fan 83 starts to rotate in a certain direction, the first permanent magnet 84 starts to rotate. Accordingly, the positions of the polarities of the magnetized N-pole and S-pole are successively displaced and a persistent repulsive force and a persistent rotational force are formed between the electromagnets 87 and the first permanent magnet 84. As a result, the rotating fan 83 does not stop rotating unless power is supplied to the electromagnets 87, and also the rotating fan 83 continuously rotates in an initial direction.

Meanwhile, when the door 20 is opened, the rotating fan 83 stops rotating.

That is, when the door 20 is opened, the interval between the first coil unit 71 and the second coil unit 72 in the non-contact power supply device 70 becomes farther. As a result, electromagnetic induction does not occur and thus power transferring stops. Finally, since power is not supplied to the electromagnets 87 in the fan accommodation case 80, and the rotational force acting on the rotating fan 83 disappears, the rotating fan 83 stops rotating.

Of course, when the door 20 is opened, the rotating fan stops rotating. However, in the case that the rotating fan 83 is intended to stop rotating even at a state where the door 20 is not opened, power from the power supply should be made to stop.

That is, when a user controls the control unit 64 via the display manipulator 40, power supplied from the power supply to first coil unit 71 stop is compulsively made to stop. Otherwise, when a predetermined set condition is met through experimental data capable of identifying improvement of the temperature deviation in the storage chamber 30 by considering the entire performance of a Kimchi storage facility which has a function of reducing a power consumption, power can be set to stop automatically under the control of the control unit 64 after the rotating fan 83 rotates for a certain time.

As described above, according to a first embodiment of the present invention, since a non-contact power supply device is installed between a main body and a door in order to make a fan installed on the bottom of the door rotate, power can be supplied without connecting a separate cable between the main body and the door. As a result, an assembly work is facilitated in an assembly production line. Also, since a power supply line is not exposed externally, a separate finishing treatment is not necessary.

In particular, the temperature deviation in the Kimchi storage facility can be improved by the forced convection of the cold air in the storage chamber according to rotation of the fan. Accordingly, performance of the Kimchi storage facility can be enhanced and reliability of products from consumers can be assumed.

Also, according to the second embodiment of the present invention, the rotating fan which is installed on the bottom of the door and forcedly circulates internal air in the storage chamber, is configured to rotate in a magnetic levitation rotation manner. Also, the non-contact power supply device is installed between the door and the main body, so that power necessary for driving of the rotating fan can be supplied as induced current by electromagnetic induction. As a result, the rotating fan can rotate without any assistance of a driving motor.

Thus, according to the second embodiment of the present invention, expenses, time, materials, and manpower consumed for installing a separate power supply unit in order to drive the rotating fan can be reduced. Also, the present invention provides an effect of improving a cumbersome and difficult working condition which may occur during installing of the power supply unit in comparison with the conventional art.

Also, according to the second embodiment of the present invention, the rotating fan is made to rotate in a magnetic levitation rotation manner, and thus a general driving motor for driving a fan is not necessary. Accordingly, there is no worry about corrosion of the driving motor due to moisture. Also, no frictional noise occurs since the rotating fan rotates without contacting the driving motor.

In particular, according to the second embodiment of the present invention, since the rotating fan rotates in a magnetic levitation rotation manner, it is easy to mount the rotating fan. Also, a fan accommodation case for accommodating the rotating fan is connected on the bottom of the door via a connector and then turned and fitted into a guide fitting unit provided on the bottom of the door. Accordingly, it is easy to mount the fan accommodation case without any assistance of a separate tool, to thereby provide an excellent workability.

What is claimed is:

1. A storage facility keeping in store foods such as Kimchi which is the Korean preserved vegetables, which comprises a main body provided with a storage room storing Kimchi, and a mechanic room where a power supply is installed, and a door opening and closing the storage room, the storage facility comprising:
    a non-contact power supply device having a first coil unit which receives power from the power supply and transfers power by electromagnetic induction, which is mounted in the upper portion of the main body, and a second coil unit which is mounted in the door in correspondence to the first coil unit, in which the non-contact power supply device is mounted correspondingly between the main body and the door;
    a driving motor which is installed in the door and receives induced current via the non-contact power supply device and is driven; and
    a fan which rotates by the driving force of the driving motor and forcedly circulates cold air in the storage chamber, which is installed on the bottom of the door.

2. The storage facility of claim 1, wherein the first coil unit in the non-contact power supply device comprises a first printed circuit board (PCB) substrate which is accommodated in a space enclosed by a lower protection cover at one side of the upper portion of the main body, and a bobbin which is connected to the first PCB substrate and around which coil is wound, so as to be connected to the power supply via a cable to receive power, and the second coil unit in the non-contact power supply device comprises a second printed circuit board (PCB) substrate which is accommodated in a space enclosed by an upper protection cover installed in the door so that induced current can be generated by electromagnetic induction against the first coil unit, and a bobbin which is connected to the second PCB substrate and around which coil is wound.

3. The storage facility of claim 2, wherein a shield plate is installed in the lower portion of the bobbin in the first coil unit.

4. A storage facility keeping in store foods such as Kimchi which is the Korean preserved vegetables, which comprises a main body partitioned with a storage room storing Kimchi, and a mechanic room where a power supply is installed, and a door opening and closing the storage room, the storage facility comprising:
    a non-contact power supply device having a first coil unit which receives power from the power supply and transfers power by electromagnetic induction, which is mounted in the upper portion of the main body, and a second coil unit which is mounted in the door in correspondence to the first coil unit; and
    a rotating fan which is installed on the bottom of the door at a state where the rotating fan is mounted in a fan accommodation case provided with a magnetic levitation unit so as to rotate in a magnetic levitation rotation manner by the induced current supplied via the non-contact power supply device.

5. The storage facility of claim 4, wherein the magnetic levitation unit comprises: a plurality of electromagnets which are connected to the second coil unit in the non-contact power supply device by wire and installed in the fan accommodation case at a predetermined interval to generate an electromagnetic force at a state where polarities of N-pole and S-pole are separated individually; a third permanent magnet which is distant from the electromagnets to have a space where the rotating fan can be installed, and which is installed on the central inner wall of the bottom of the fan accommodation case; a first permanent magnet which generates a repulsive force against the plurality of electromagnets in which N-poles and S-poles which are integrally mounted in one side of the rotating fan are repeatedly magnetized so that the rotating fan can receive a rotational force; and a second permanent magnet which generates a repulsive force against the third permanent magnet and which is integrally mounted on the other side surface of the rotating fan which opposes the first permanent magnet.

6. The storage facility of claim 5, wherein the rotating fan comprises: a cylindrical body on both sides of which the first permanent magnet and the second permanent magnet are mounted, a wing portion having a plurality of rotating wings which are formed on the outer circumferential surface of the cylindrical body; and a rotating axis which protrudes at the center of the cylindrical body, so as to be freely rotated by magnetic levitation in the fan accommodation case.

7. The storage facility of claim 6, wherein the fan accommodation case comprises: a cap-shaped fan cover in which the rotating fan is accommodated and supported, on the bottom of which a plurality of inhaling holes are formed so that cold air in the storage chamber can be inhaled and discharged, on the lateral surfaces of which a plurality of discharging holes are formed, and on the bottom of which the third permanent magnet is mounted on the central inner wall thereof; and a base cover which includes a cover surface which blocks the upper opening of the fan cover and a support hole through which the rotational axis of the rotating fan is inserted freely rotatably at the center of the cover surface, in which an electromagnets accommodation unit accommodating the electromagnets of the magnetic levitation unit is provided on the cover surface facing the support hole and which is fitted with the fan cover and mounted in a mount portion provided on the bottom of the door.

8. The storage facility of claim 7, wherein a flange-shaped fitting guide is provided on the outer circumferential surface of the electromagnets accommodation portion in the base cover, and the base cover is turned and fitted with the guide fitting portion provided in the mount portion on the bottom of the door via the fitting guide.

9. The storage facility of claim 7, wherein the fan cover and the base cover are fitted with each other in a hook manner.

10. The storage facility of claim 4, wherein the first coil unit in the non-contact power supply device comprises a first printed circuit board (PCB) substrate which is accommodated in a space enclosed by a lower protection cover at one side of the upper portion of the main body, and a bobbin which is connected to the first PCB substrate and around which coil is wound, so as to be connected to the power supply via a cable to receive power, and the second coil unit in the non-contact power supply device comprises a second printed circuit board (PCB) substrate which is accommodated in a space enclosed by an upper protection cover installed in the door, and a bobbin which is connected to the second PCB substrate and around which coil is wound.

11. The storage facility of claim 10, wherein a shield plate is installed in the lower portion of the bobbin in the first coil unit.

* * * * *